US011958063B2

(12) United States Patent
Miki

(10) Patent No.: US 11,958,063 B2
(45) Date of Patent: Apr. 16, 2024

(54) CENTRIFUGE HAVING CONTROL UNIT THAT STOPS ROTATION OF A ROTOR WHEN A DISPLACEMENT-CONVERSION VALUE SATISIFIES A DISPLACEMENT DETERMINATION CRITERION

(71) Applicant: KUBOTA MANUFACTURING CORPORATION, Tokyo (JP)

(72) Inventor: Chitoshi Miki, Gunma (JP)

(73) Assignee: KUBOTA MANUFACTURING CORPORATION, Tokyo (JP)

( * ) Notice: Subject to any disclaimer, the term of this patent is extended or adjusted under 35 U.S.C. 154(b) by 940 days.

(21) Appl. No.: 16/961,838

(22) PCT Filed: Jan. 10, 2019

(86) PCT No.: PCT/JP2019/000519
§ 371 (c)(1),
(2) Date: Jul. 13, 2020

(87) PCT Pub. No.: WO2019/146415
PCT Pub. Date: Aug. 1, 2019

(65) Prior Publication Data
US 2020/0384483 A1 Dec. 10, 2020

(30) Foreign Application Priority Data
Jan. 25, 2018 (JP) ................................ 2018-010201

(51) Int. Cl.
*B04B 9/10* (2006.01)
*B04B 5/04* (2006.01)
*B04B 13/00* (2006.01)

(52) U.S. Cl.
CPC ............. *B04B 9/10* (2013.01); *B04B 5/0414* (2013.01); *B04B 13/00* (2013.01)

(58) Field of Classification Search
CPC ......... B04B 9/10; B04B 5/0414; B04B 13/00; B04B 9/146; B04B 7/06
See application file for complete search history.

(56) References Cited

U.S. PATENT DOCUMENTS 10,532,366 B2 1/2020 Tomaru
2002/0077239 A1 6/2002 Evans et al.
(Continued)

FOREIGN PATENT DOCUMENTS

JP 06-034749 U 5/1994
JP 2002-306989 A 10/2002
(Continued)

OTHER PUBLICATIONS

Search Report issued in European Patent Office (EPO) Patent Application No. 19743823.7, dated Oct. 21, 2021.
(Continued)

*Primary Examiner* — Walter D. Griffin
*Assistant Examiner* — Shuyi S. Liu
(74) *Attorney, Agent, or Firm* — GREENBLUM & BERNSTEIN, P.L.C.

(57) ABSTRACT

Damage caused by displacement of a rotating shaft is prevented with an acceleration sensor. A centrifuge according to the present invention includes a rotor, a driving source that rotates the rotor, a rotating shaft that links the rotor with the driving source, an acceleration sensor, and a control unit. The acceleration sensor outputs a value indicating acceleration in at least two different directions which are orthogonal to an axial direction of the rotating shaft. The control unit obtains a displacement conversion value corresponding to a value, which is obtained by dividing a value which is proportional to acceleration based on a value indicating acceleration and outputted by the acceleration sensor, by a value which is proportional to a square of an angular
(Continued)

velocity of the rotor, and stops rotation of the rotor when the displacement conversion value satisfies a displacement determination criterion which is predetermined and indicates that displacement is large.

4 Claims, 5 Drawing Sheets

(56) References Cited

U.S. PATENT DOCUMENTS

| | | | | |
|---|---|---|---|---|
| 2005/0079064 | A1* | 4/2005 | Shimizu | B04B 9/146 494/9 |
| 2019/0134646 | A1 | 5/2019 | Takahashi et al. | |

FOREIGN PATENT DOCUMENTS

| | | | | | |
|---|---|---|---|---|---|
| JP | 2002306989 | A | * | 10/2002 | |
| JP | 2005-111402 | A | | 4/2005 | |
| JP | 2006-122239 | A | | 5/2006 | |
| JP | 2006122239 | A | * | 5/2006 | |
| JP | 2017-087178 | A | | 5/2017 | |
| WO | WO-2017085965 | A1 | * | 5/2017 | B04B 5/02 |

OTHER PUBLICATIONS

Official Communication issued in International Bureau of WIPO Patent Application No. PCT/JP2019/000519, dated Apr. 9, 2019.

Office Action issued in Japanese Counterpart Patent Appl. No. 2018-010201, dated Dec. 14, 2021, along with an English translation thereof.

* cited by examiner

CENTRIFUGE HAVING CONTROL UNIT THAT STOPS ROTATION OF A ROTOR WHEN A DISPLACEMENT-CONVERSION VALUE SATISIFIES A DISPLACEMENT DETERMINATION CRITERION

TECHNICAL FIELD

The present invention relates to a centrifuge that detects an imbalanced state and controls rotation.

BACKGROUND ART

Imbalance is generated on a rotor in which a sample is placed (a state that the center of gravity of the entire rotor including the sample is not on a rotating shaft). If this imbalance becomes too large, the rotor, the rotating shaft, or the like swings excessively, causing a failure of a centrifuge. Patent Literature 1, for example, is known as a technique for detecting swing caused by such imbalance.

PRIOR ART LITERATURE

Patent Literature

Patent Literature 1: Japanese Patent Application Laid Open No. 2017-87178

SUMMARY OF THE INVENTION

Problems to be Solved by the Invention

The centrifuge of Patent Literature 1 includes an acceleration sensor that outputs a value indicating acceleration in two different directions orthogonal to an axial direction of a rotating shaft of a rotor. Further, an acceleration corresponding value being a value corresponding to the acceleration in the direction orthogonal to the axial direction of the rotating shaft is obtained from the value indicating the acceleration in the two different directions, and rotation of the rotor is stopped when the acceleration corresponding value satisfies a predetermined determination criterion indicating that acceleration is large.

The centrifuge of Patent Literature 1 stops rotation of the rotor based on force applied to, for example, a vibration isolating unit of the centrifuge, so that damage caused by stress can be prevented. However, since acceleration is proportional to a radius of vibration and is proportional to the square of an angular velocity, influence of an angular velocity is greater than influence of a radius. Therefore, it is difficult to prevent damage that is caused by a rotor, a bucket, a rotating shaft, or the like coming into contact with a chamber or the like, and that occurs when the rotation speed (angular velocity) is low but displacement of the rotating shaft (a radius of vibration) is large.

In addition, displacement can be also detected if a centrifuge further includes a displacement sensor. However, the centrifuge is to have both of an acceleration sensor and a displacement sensor and to perform processing of signals of these sensors. Accordingly, the centrifuge becomes expensive.

The present invention has been made in view of such a situation, and an object of the present invention is to prevent damage caused by displacement of a rotating shaft by using an acceleration sensor.

Means to Solve the Problems

A centrifuge according to the present invention includes a rotor, a driving source that rotates the rotor, a rotating shaft that links the rotor with the driving source, an acceleration sensor, and a control unit. The acceleration sensor outputs a value indicating acceleration in at least two different directions which are orthogonal to an axial direction of the rotating shaft. The control unit obtains a displacement conversion value corresponding to a value, which is obtained by dividing a value which is proportional to acceleration based on a value indicating acceleration and outputted by the acceleration sensor, by a value which is proportional to a square of an angular velocity of the rotor, and stops rotation of the rotor when the displacement conversion value satisfies a displacement determination criterion which is predetermined and indicates that displacement is large.

Effects of the Invention

According to the centrifuge of the present invention, vibration caused by imbalance can be detected with a value converted into displacement without using a displacement sensor. Accordingly, a rotor, a bucket, a rotating shaft, or the like can be prevented from coming into contact with a chamber or the like.

DETAILED DESCRIPTION OF THE EMBODIMENTS

Figure 1:
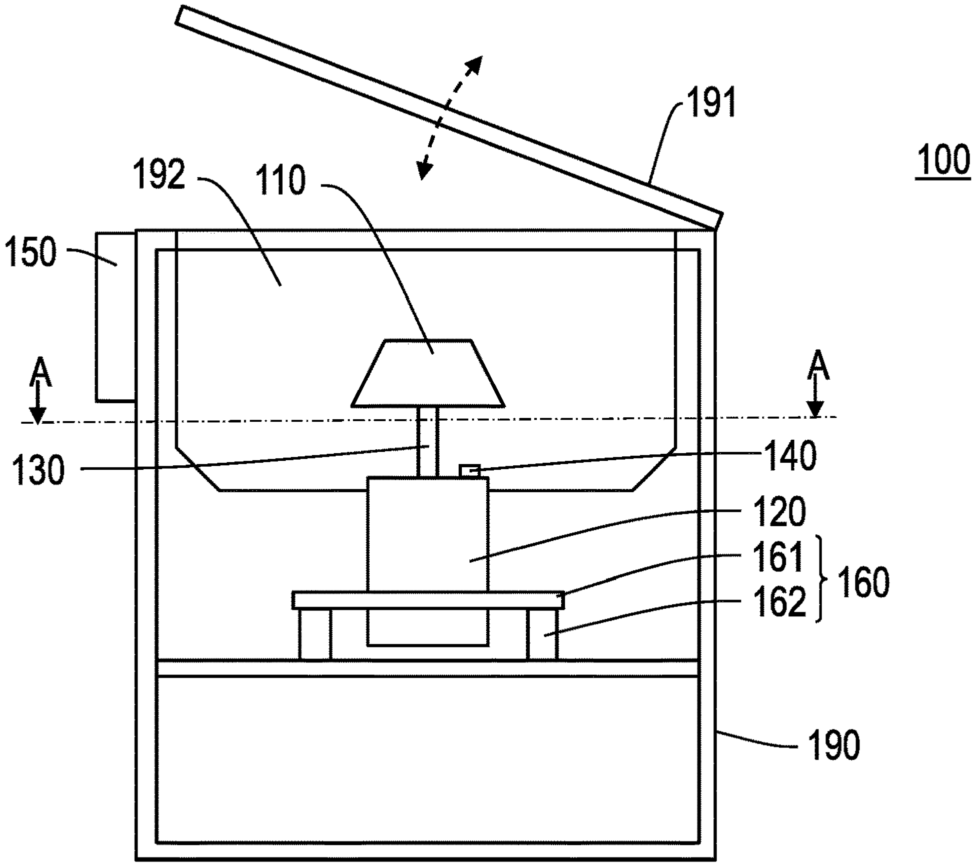
FIG. 1 is a diagram illustrating a configuration example of a centrifuge according to the present invention.

An embodiment according to the present invention is described in detail below. Components having the mutually same functions are provided with the same reference characters and duplicate description thereof is omitted.

First Embodiment

FIG. 1 illustrates a configuration example of a centrifuge according to a first embodiment. A centrifuge 100 includes a casing 190, a chamber 192, an openable and closable chamber lid 191, a rotor 110 which is housed in the chamber 192, a driving source 120 which rotates the rotor 110, a rotating shaft 130 which links the rotor 110 with the driving source 120, an acceleration sensor 140, a control unit 150, and a vibration isolating unit 160.

Figure 2:
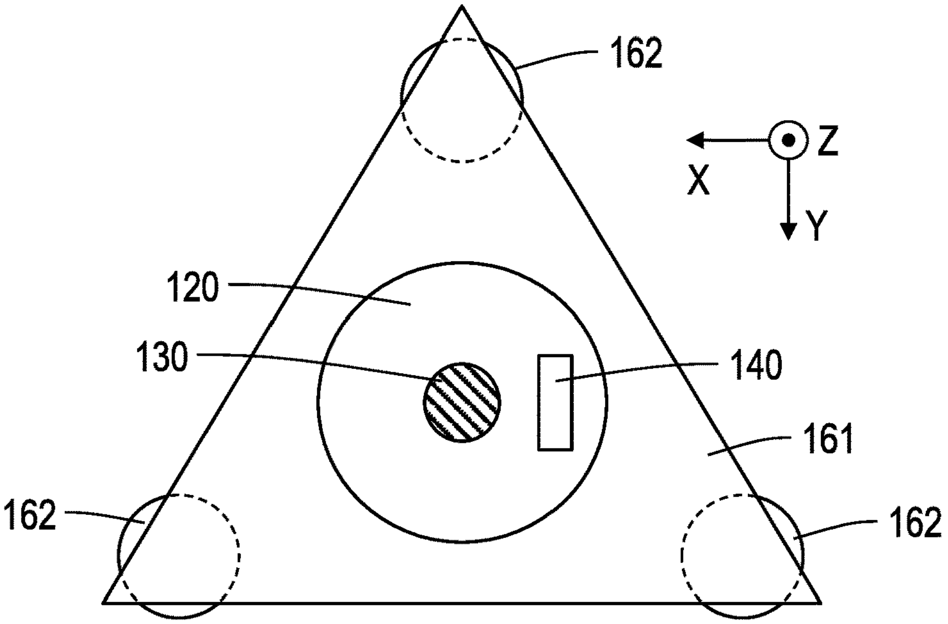
FIG. 2 is a diagram illustrating a driving source 120, a rotating shaft 130, an acceleration sensor 140, and a vibration isolating unit 160 taken along the A-A line of FIG. 1.
Figure 3A:
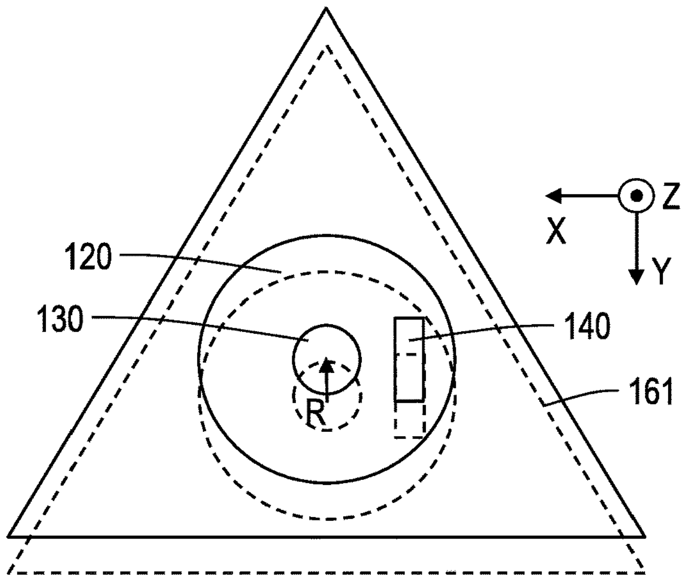
FIG. 3A is a first diagram illustrating a state that the driving source 120, the rotating shaft 130, the acceleration sensor 140, and the vibration isolating unit 160 vibrate.
Figure 3B:
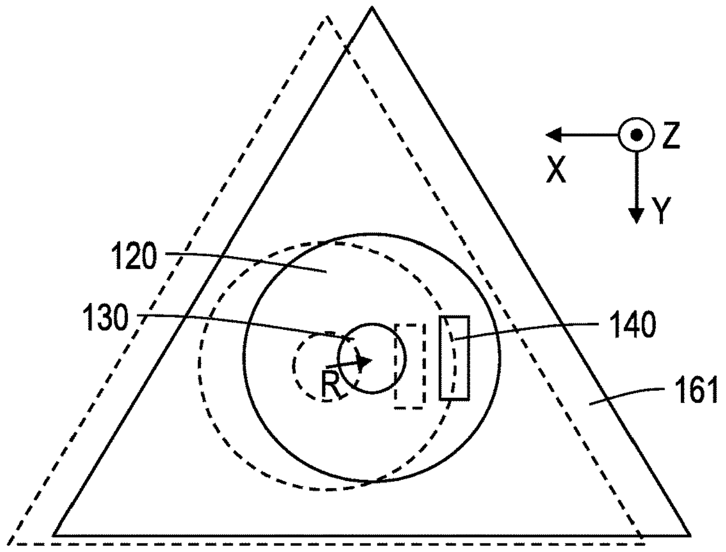
FIG. 3B is a second diagram illustrating the state that the driving source 120, the rotating shaft 130, the acceleration sensor 140, and the vibration isolating unit 160 vibrate.
Figure 3C:
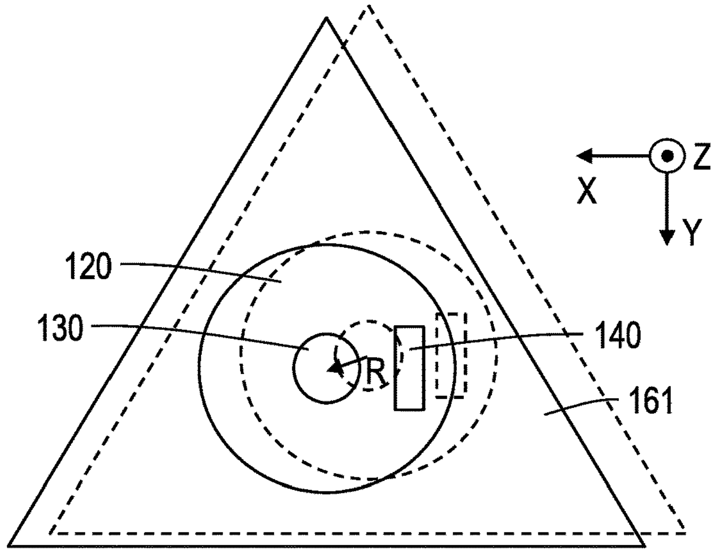
FIG. 3C is a third diagram illustrating the state that the driving source 120, the rotating shaft 130, the acceleration sensor 140, and the vibration isolating unit 160 vibrate.

FIG. 2 is a diagram illustrating the driving source 120, the rotating shaft 130, the acceleration sensor 140, and the vibration isolating unit 160 taken along the A-A line of FIG. 1. FIGS. 3A to 3C are diagrams illustrating a state that the driving source 120, the rotating shaft 130, the acceleration sensor 140, and the vibration isolating unit 160 vibrate. Positions indicated by dotted lines in FIGS. 3A to 3C are original positions and FIGS. 3A to 3C illustrate states shifted in mutually-different directions.

There are some types of rotors as the rotor 110 such as a type provided with a hole for housing a test tube or the like and a type for attaching a bucket for housing a tube rack, in which samples are to be put, to the rotor 110. However, the present invention is applicable irrespective of a type of the rotor 110, so that the type of the rotor 110 is not limited. The vibration isolating unit 160 has a role of attenuating vibration caused by imbalance of the rotor 110. For example, the vibration isolating unit 160 may be composed of a supporting plate 161 which grips the driving source 120 and a plurality of vibration isolating springs 162, one ends of which are fixed on the casing 190 and the other ends of which are fixed on the supporting plate 161, as illustrated in FIGS. 1 and 2. Further, an elastic body such as rubber may be used instead of the vibration isolating spring.

The acceleration sensor 140 outputs values indicating acceleration in at least two different directions which are orthogonal to the axial direction of the rotating shaft. More specifically, the acceleration sensor 140 is attached to the driving source 120 or the supporting plate 161 and measures acceleration of vibration of the driving source 120 which is generated along with rotation of the rotor 110. The acceleration sensor 140 may be attached to the upper surface of the driving source 120 as illustrated in FIGS. 1 and 2 or may be attached on the lower part of the driving source 120, for example. In the first embodiment, the two directions are orthogonal to each other, in which one is referred to as the X axis direction and the other is referred to as the Y axis direction. Further, the axial direction of the rotating shaft 130 is referred to as the Z axis direction. Furthermore, a value indicating acceleration in the X axis direction is denoted by $a_X$ and a value indicating acceleration in the Y axis direction is denoted by $a_Y$. Here, a "value indicating acceleration" is not only a value accorded with acceleration but also a value proportional to acceleration and a value discretely indicating a value proportional to acceleration such as a digital signal.

$a_X$ and $a_Y$ which are outputs from the acceleration sensor 140 of the first embodiment are values indicating acceleration in the directions which are mutually orthogonal, and when inclination of the rotating shaft 130 is ignorable, $$(a_X^2+a_Y^2)^{1/2}=R\omega^2 \qquad (1)$$

is established. R is a value indicating a magnitude of shift (amplitude) and indicating displacement of the rotating shaft 130, the vibration isolating unit 160, and the like, from stationary states thereof. ω denotes an angular velocity of the rotating shaft 130.

When displacement R is increased, inclination of the rotating shaft 130 is increased, and vibration in the Z direction accordingly becomes unignorable. In the case where vibration in the Z direction is not ignorable either, when a value indicating acceleration in the Z axis direction is denoted by $a_Z$, $$(a_X^2+a_Y^2+a_Z^2)^{1/2}=R\omega^2 \qquad (2)$$

is established. When vibration needs to be detected in which vibration in the Z direction is not ignorable either, the acceleration sensor 140 also outputs the value $a_Z$ indicating acceleration in the Z direction of vibration of the driving source 120 (in the axial direction of the rotating shaft 130) caused by rotation of the rotor 110.

Figure 4:
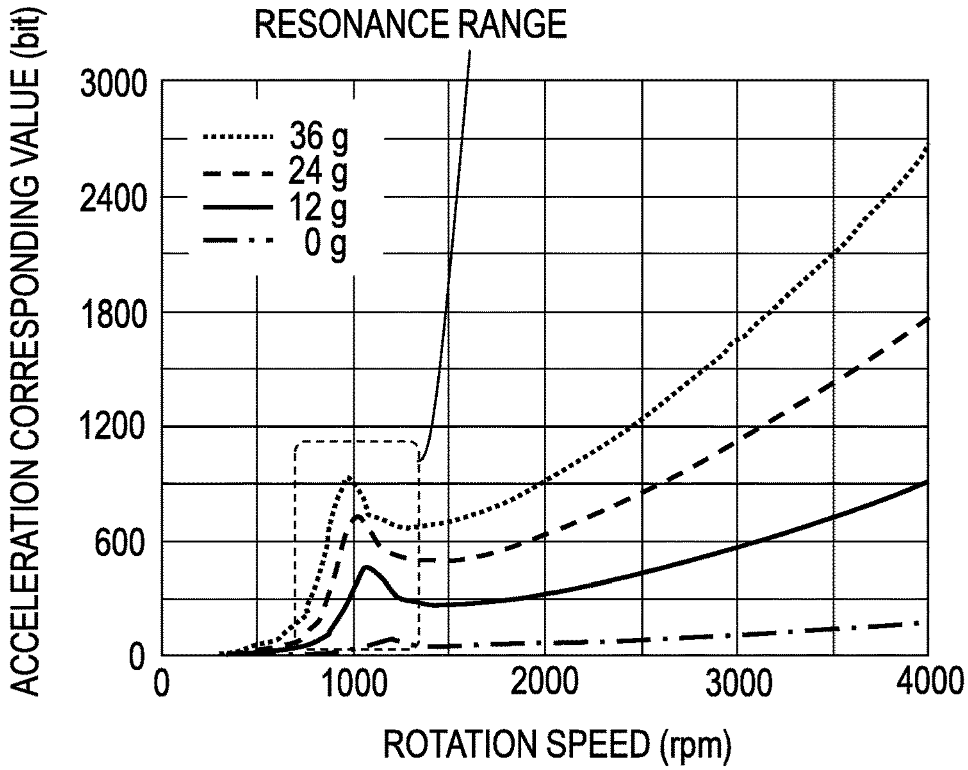
FIG. 4 is a diagram illustrating a relation between a rotation speed and acceleration for each imbalance in a certain centrifuge.

FIG. 4 illustrates a relation between a rotation speed and acceleration for each imbalance in a certain centrifuge. The horizontal axis indicates a rotation speed (rpm) and the vertical axis indicates an acceleration corresponding value (bit), and the cases of rotor imbalance of 0 g, 12 g, 24 g, and 36 g are shown. The acceleration corresponding value (bit) in the vertical axis is a value obtained by calculating $(a_X^2+a_U^2+a_Z^2)^{1/2}$ with outputs ($a_X$, $a_Y$, $a_Z$) from the acceleration sensor in three orthogonal axial directions. 256 bits correspond to 1 G (approximately 9.8 $m/s^2$). Since acceleration is proportional to a square of an angular velocity, the acceleration corresponding value increases as the rotation speed increases in the example of FIG. 4. Further, there is a range having large acceleration corresponding values around 1000 rpm of rotation speed in the example of FIG. 4. This range is a range of a state in which vibration of the rotor 110 is resonated, and the range is referred to as a "resonance range" in the present specification. The "resonance range" is a range corresponding to a specific angular velocity at which displacement of the rotating shaft of the rotor 110 increases and the "resonance range" is determined depending on a configuration of the vibration isolating unit 160, mass of the rotor 110, and the like. However, an angular velocity at which a resonance point is obtained varies every time in a certain range because of an influence of mass of a sample to be housed in the rotor 110. For example, a range corresponding to an angular velocity at which a resonance point can be obtained in consideration of an influence of mass of a sample may be referred to as a resonance range. Further, a range also including a range corresponding to an angular velocity at which a half of a displacement conversion value on a resonance point can be obtained may be referred to as a resonance range. In the case of a general centrifuge, a resonance range is often a part of a range from 500 to 1500 rpm. "Corresponding to an angular velocity" indicates that a value may be an angular velocity itself or another certain parameter having a certain relation with an angular velocity. Since a rotation speed is proportional to an angular velocity, a rotation speed is one of values corresponding to an angular velocity, for example. A "range corresponding to an angular velocity" may be a range defined by an angular velocity or may be a range defined by a value corresponding to an angular velocity such as a rotation speed.

Figure 5:
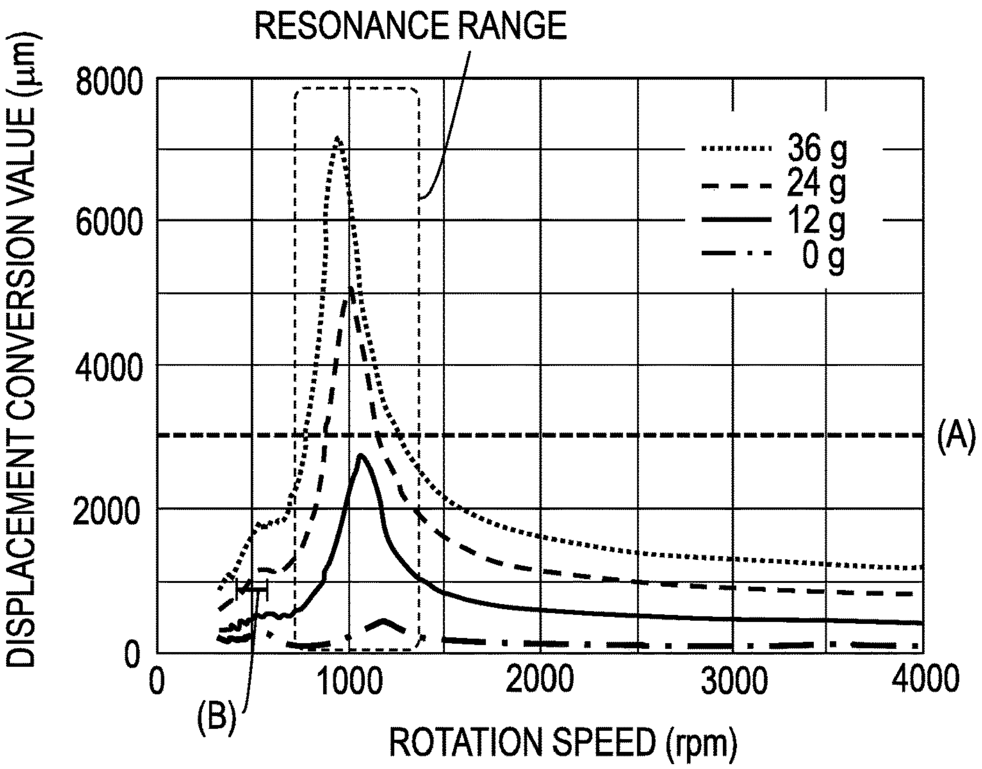
FIG. 5 is a diagram illustrating a relation between a rotation speed and displacement for each imbalance in a certain centrifuge.

FIG. 5 illustrates a relation between a rotation speed and displacement for each imbalance in a certain centrifuge. This drawing shows a value obtained by converting the vertical axis in the example of FIG. 4 into displacement (displacement conversion value). A displacement conversion value is a value obtained by dividing measured acceleration by the square of the measured acceleration. FIG. 5 shows a unit of a displacement conversion value as μm, but a value obtained by multiplying a unit of a length by a coefficient may be employed instead of a unit of actual length as is the case with FIG. 4. As FIGS. 4 and 5 show, acceleration increases when a rotation speed is high and displacement increases in the resonance range.

Figure 6:
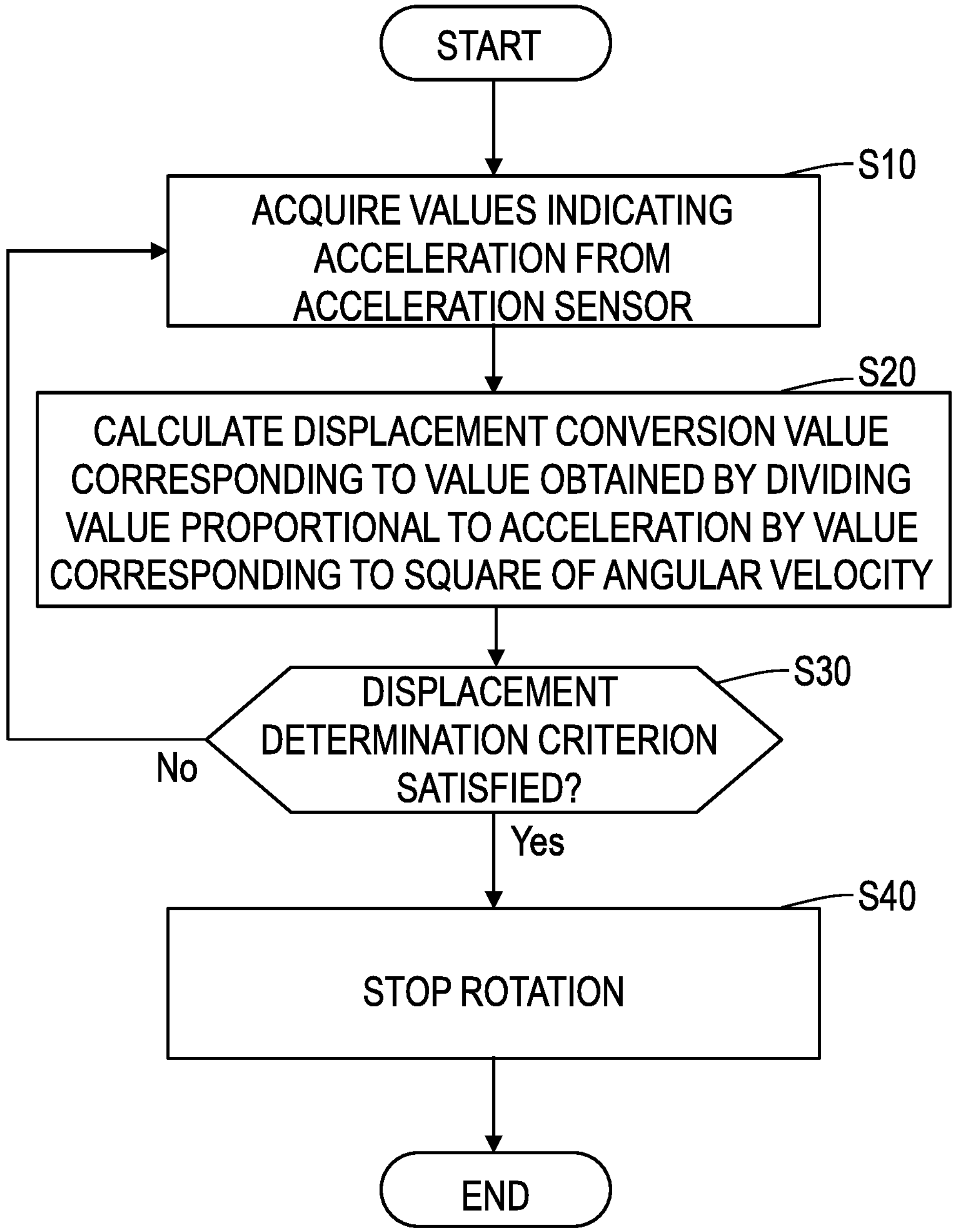
FIG. 6 is a diagram illustrating a processing flow of a control unit.

FIG. 6 is a diagram illustrating a processing flow of the control unit 150. The control unit 150 acquires values indicating acceleration and outputted by the acceleration sensor 140 (S10). The control unit 150 obtains a displacement conversion value (S20). The "displacement conversion value" is a value corresponding to a value, which is obtained by dividing a value which is proportional to acceleration based on a value indicating acceleration and outputted by the acceleration sensor 140, by a value which is proportional to the square of an angular velocity of the rotor 110. When the displacement conversion value satisfies a predetermined displacement determination criterion indicating large displacement (S30), the control unit 150 stops rotation of the rotor (S40).

As the displacement determination criterion, there is a criterion for making determination depending on whether or not to excess a threshold value which is determined as the dotted line (A) shown in FIG. 5, for example. The displacement determination criterion can prevent the rotor, the bucket, the rotating shaft, or the like from coming into contact with the chamber or the like irrespective of an angular velocity (rotation speed).

As another example, there is a method for setting a displacement determination criterion in a predetermined range, below a resonance range, of a value corresponding to an angular velocity as (B) shown in FIG. 5. The "value corresponding to an angular velocity" includes an angular velocity itself and a rotation speed, for example. However, the "value corresponding to an angular velocity" is not limited to these but includes a value obtained by multiplying an angular velocity by an arbitrary constant. The "predetermined range, below a resonance range, of a value corresponding to an angular velocity" is a range which is defined for each centrifuge and a range which is below a value corresponding to the lowest angular velocity in the resonance range obtained in consideration of a sample which can be housed as well. In the example of (B) in FIG. 5, the displacement determination criterion is set in a range from 400 to 600 rpm of rotation speed. That is, when a value corresponding to an angular velocity of the rotor 110 is in the predetermined range, below a resonance range, of a value corresponding to an angular velocity (for example, 400 to 600 rpm), the control unit 150 obtains a displacement conversion value and confirms whether or not the displacement conversion value satisfies a displacement determination criterion. If the range is set as from 400 to 600 rpm, vibration caused by imbalance can be appropriately detected even when the resonance range is changed because of deterioration of the vibration isolating spring 162 or an elastic body such as rubber used instead of the vibration isolating spring 162 or use environments such as a temperature.

If determination is made at an angular velocity below the resonance range, the determination can be made when displacement is small, easily preventing the rotor, the bucket, the rotating shaft, or the like from coming into contact with the chamber or the like. Especially, if a displacement conversion value which is smaller than the maximum value of a displacement conversion value in a resonance range in the allowable maximum imbalance is included in a range satisfying the displacement determination criterion, rotation of the rotor 110 can be stopped before the displacement becomes large, being able to further prevent the contact. For example, imbalance less than 24 g is defined as allowable imbalance. Here, even with the same imbalance, a displacement conversion value changes depending on the difference in mass of an entire sample and the like. Therefore, a displacement determination criterion may be defined in consideration of this change. In the example of (B) in FIG. 5, a threshold value is set as 900 μm in the range from 400 to 600 rpm so that the displacement determination criterion is satisfied as long as imbalance is 24 g or greater irrespective of mass of an entire sample. This threshold value is smaller than the maximum value (approximately 2700 μm) of a displacement conversion value in the resonance range for the case of 12 g imbalance which is smaller imbalance than the allowable maximum imbalance. That is, if a displacement determination criterion is set in a predetermined range, below a resonance range, of a value corresponding to an angular velocity, rotation of the rotor can be stopped when a displacement conversion value which is smaller than the maximum value of an allowable displacement conversion value is obtained.

Further, if imbalance determination based on a displacement conversion value is performed in a predetermined range, below a resonance range, of a value corresponding to an angular velocity, rotation of the centrifuge can be stopped at lower rotation. That is, time from start to end of rotation of the centrifuge with imbalance can be shortened, also providing an advantageous effect that waiting time of a user can be shortened. Further, if a range satisfying a displacement determination criterion includes a displacement conversion value which is smaller than the maximum value of a displacement conversion value in a resonance range in the allowable maximum imbalance, a load on the vibration isolating spring 162 or an elastic body such as rubber used instead of the vibration isolating spring 162 can be put within a range of a using condition assumed in designing even when there is imbalance, providing an advantageous effect that damage and deterioration can be prevented.

According to the centrifuge 100, vibration caused by imbalance can be detected with a value converted into displacement without using a displacement sensor. Accordingly, the rotor, the bucket, the rotating shaft, or the like can be prevented from coming into contact with the chamber or the like.

Figure 7:
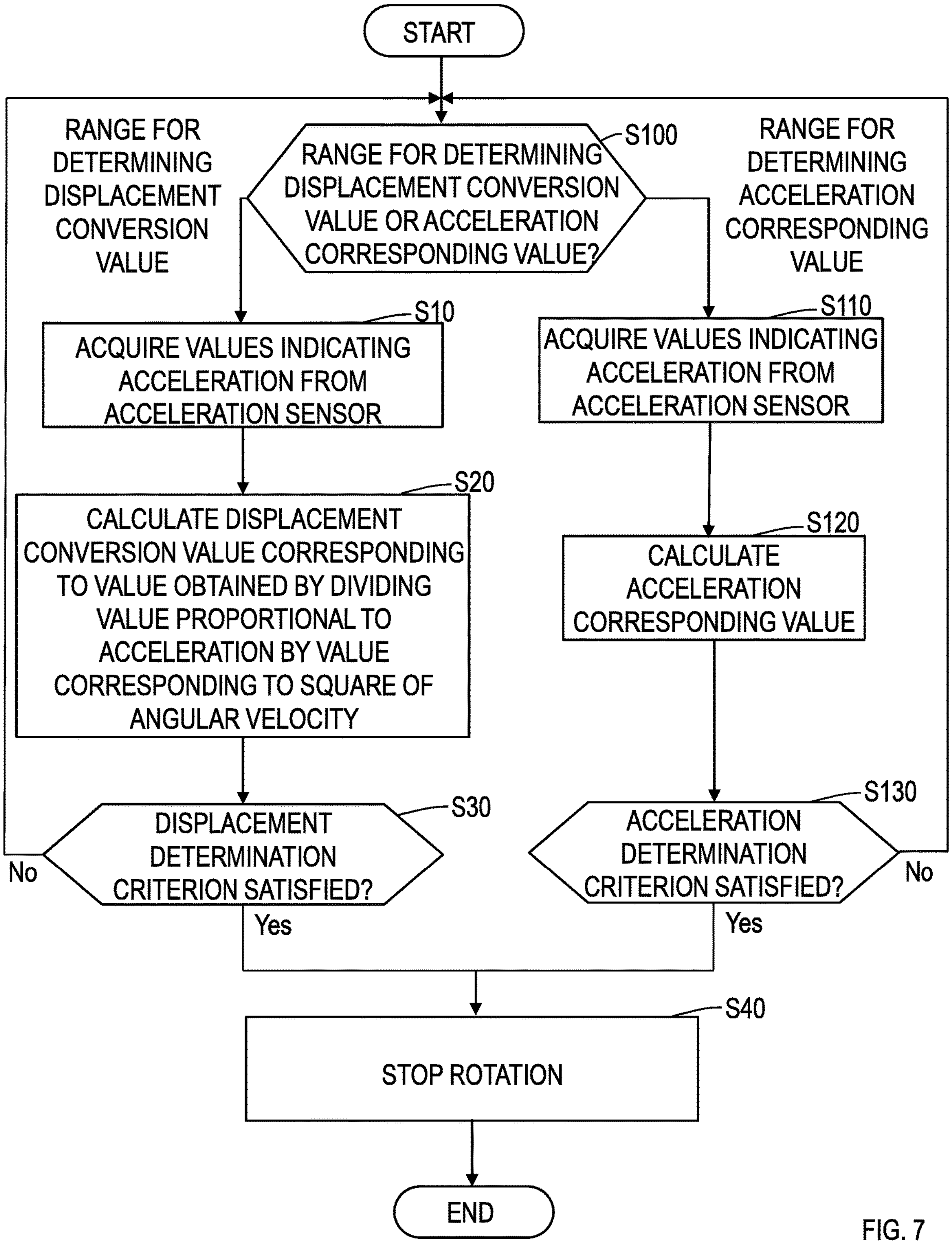
FIG. 7 is a diagram illustrating a processing flow using both of a displacement determination criterion and an acceleration determination criterion.

Further, if stop control based on an acceleration corresponding value is performed, damage caused by stress applied to the vibration isolating unit 160 or the like can be also prevented. FIG. 7 illustrates an example of a processing flow using both of a displacement determination criterion and an acceleration determination criterion. The control unit 150 confirms whether a value corresponding to an angular velocity is in a range for performing determination based on a displacement conversion value or a range for performing determination based on an acceleration corresponding value (S100). In the example of (B) in FIG. 5, the range from 400 to 600 rpm is the range for performing determination based on a displacement conversion value. Further, 1500 rpm or greater may be defined as the range for performing determination based on an acceleration corresponding value. If a range for performing determination based on a displacement conversion value and a range for performing determination based on an acceleration corresponding value are thus set, determination based on a displacement conversion value can be performed when a value corresponding to an angular velocity is below a resonance range, while determination based on an acceleration corresponding value can be performed when the value corresponding to an angular velocity is above the resonance range. The control unit 150 repeats step S100 during operation of the centrifuge 100 when the value is neither in the range for performing determination based on a displacement conversion value nor in the range for performing determination based on an acceleration corresponding value. When the control unit 150 determines that the value is in the range for performing determination based on a displacement conversion value in step S100, the control unit 150 performs the same processing as those in steps S10 to S40 illustrated in FIG. 6.

When the control unit 150 determines that the value is in the range for performing determination based on an acceleration corresponding value in step S100, the control unit 150 acquires values indicating acceleration from the acceleration sensor 140 (S110). Values indicating acceleration may be values indicating acceleration in two different directions orthogonal to the axial direction of the rotating shaft 130 or may also include acceleration in the axial direction of the rotating shaft 130. The control unit 150 calculates an acceleration corresponding value which is a value corresponding to acceleration (S120). Specifically, the calculation may be performed with formula (1) or formula (2). Further, a displacement conversion value is not calculated in step S120, so that calculation of square root may be omitted as $a_X^2+a_Y^2$ or $a_X^2+a_Y^2+a_Z^2$, for example. The control unit 150 compares the obtained acceleration corresponding value with the acceleration determination criterion (S130), and the control unit 150 stops rotation of the rotor when the acceleration determination criterion is satisfied (S40). For example, it may be defined that the acceleration determination criterion is satisfied when an acceleration corresponding value based on $a_X^2+a_Y^2$ or $a_X^2+a_Y^2+a_Z^2$ exceeds a criterion expressed by a curved line or a straight line at an angular velocity above a resonance range. More specifically, an acceleration corresponding value is set to be a value proportional to $(a_X^{2+a}{}_Y^{2})^{1/2}$ or $(a_X^2+a_X^2+a_Z^2)^{1/2}$. Then, it may be defined that the acceleration determination criterion is satisfied when an acceleration corresponding value exceeds a criterion ($b\omega^2+c\omega+d$+offset value), which is expressed by a quadratic function of an angular velocity of the rotating shaft 130, at an angular velocity above the resonance range (for example, 1500 rpm or greater) as described in Patent Literature 1. Here, as is the case with Patent Literature 1, an acceleration corresponding value may be set to a value proportional to $a_X^2+a_Y^2$ or $a_X^2+a_Y^2+a_Z^2$ and a criterion may be expressed by a quartic function. Further, an acceleration corresponding value may be set to a value proportional to $(a_X^{2+a}{}_Y^{2})^{1/4}$ $^{or}$ $(^{a}{}_X^{2}+a_Y^2+a_Z^2)^{1/4}$ and a criterion may be expressed by a linear function. Furthermore, the acceleration corresponding value obtained with formula (1) or formula (2) may be used. In this case, a range of a value corresponding to all acceleration may be defined as a range for performing determination based on an acceleration corresponding value, an acceleration corresponding value of 1200 bits in FIG. 4 may be set to a threshold value, and it may be determined that an acceleration corresponding value satisfies the acceleration determination criterion when the acceleration corresponding value is equal to or greater than the threshold value, for example.

In the processing flow illustrated in FIG. 7, the acceleration sensor 140 can singly prevent contact caused by large vibration and also prevent damage by stress caused by large acceleration. Further, as described above, a displacement determination criterion which is a fixed value is used at an angular velocity which is below a resonance range and an acceleration determination criterion which is an approximate curve is used at an angular velocity which is above the resonance range. Accordingly, damage of the centrifuge can be prevented, further, imbalance can be detected at an earlier stage than prior art after start of rotation, and advantageous effects such as deterioration prevention can be expected.

DESCRIPTION OF REFERENCE NUMERALS

100 centrifuge
110 rotor
120 driving source
130 rotating shaft
140 acceleration sensor
150 control unit
160 vibration isolating unit
161 supporting plate
162 vibration isolating spring
190 casing
191 chamber lid
192 chamber

What is claimed is:

1. A centrifuge comprising:

a rotor;

a driving source that rotates the rotor;

a rotating shaft that links the rotor with the driving source;

an acceleration sensor that outputs a value indicating acceleration in at least two different directions which are orthogonal to an axial direction of the rotating shaft; and a control unit that obtains a displacement-conversion value corresponding to a value, the value being obtained by dividing a value which is proportional to acceleration based on a value indicating acceleration and outputted by the acceleration sensor, by a value which is proportional to a square of an angular velocity of the rotor, and that stops rotation of the rotor when the displacement-conversion value satisfies a displacement determination criterion which is predetermined and indicates that displacement is large, wherein a range that corresponds to an angular velocity at which displacement of the rotating shaft of the rotor increases due to resonance is defined to be a resonance range, the control unit obtains the displacement-conversion value when an angular velocity of the rotor is in a predetermined range of an angular velocity, the predetermined range being below the resonance range, so as to confirm whether the displacement-conversion value satisfies the displacement determination criterion, and a case of the displacement-conversion value, the displacement-conversion value being smaller than a maximum displacement conversion value in the resonance range in allowable maximum imbalance, is included in a range satisfying the displacement determination criterion.

2. The centrifuge according to claim 1, wherein the control unit obtains an acceleration-corresponding value based on an output of the acceleration sensor, and stops rotation of the rotor when the acceleration-corresponding value satisfies an acceleration determination criterion which is predetermined and indicates that acceleration is large.

3. The centrifuge according to claim 2, wherein the control unit confirms whether the acceleration-corresponding value satisfies the acceleration determination criterion when an angular velocity of the rotor is above the resonance range.

4. The centrifuge according to claim 1, wherein the acceleration sensor also outputs a value indicating acceleration in an axial direction of the rotating shaft.

* * * * *